United States Patent
Routt et al.

(10) Patent No.: US 7,225,849 B2
(45) Date of Patent: Jun. 5, 2007

(54) TIRE INFLATION AND HANDLING ASSISTANCE DEVICE

(75) Inventors: Stan Routt, Long Beach, CA (US); Hermilio Rubio, Long Beach, CA (US)

(73) Assignee: EZ Lift Tire Equipment LLC, Long Beach, CA (US)

( * ) Notice: Subject to any disclaimer, the term of this patent is extended or adjusted under 35 U.S.C. 154(b) by 0 days.

(21) Appl. No.: 10/773,953

(22) Filed: Feb. 6, 2004

(65) Prior Publication Data

US 2005/0173074 A1  Aug. 11, 2005

(51) Int. Cl.
    *B60C 25/00* (2006.01)
(52) U.S. Cl. .......................................... 157/19; 157/1.1
(58) Field of Classification Search .................. 157/14, 157/19–21, 1, 1.1
    See application file for complete search history.

(56) References Cited

U.S. PATENT DOCUMENTS

| | | | | |
|---|---|---|---|---|
| 1,704,440 A | * | 3/1929 | Little ............................ | 157/19 |
| 1,936,984 A | * | 11/1933 | Listebarger ................... | 157/19 |
| 2,233,371 A | * | 2/1941 | Smith ............................ | 157/21 |
| 2,920,664 A | * | 1/1960 | Lomen et al. ................. | 157/19 |
| 2,936,827 A | * | 5/1960 | Riggs ........................... | 157/1.1 |
| 3,049,159 A | * | 8/1962 | Gambardella ................. | 157/14 |
| 3,067,789 A | * | 12/1962 | Roesch ......................... | 157/19 |
| 3,580,320 A | * | 5/1971 | Roberts ......................... | 157/21 |
| 3,583,238 A | * | 6/1971 | Haynes ......................... | 73/487 |
| 3,783,928 A | * | 1/1974 | Lee ............................... | 157/1.1 |
| 5,088,539 A | * | 2/1992 | Mannen et al. .............. | 157/1.17 |
| 5,219,012 A | * | 6/1993 | Corghi .......................... | 157/19 |
| 5,649,582 A | * | 7/1997 | Hjorth-Hansen .............. | 157/19 |

* cited by examiner

*Primary Examiner*—D. S. Meislin
(74) *Attorney, Agent, or Firm*—Renner, Kenner, Grieve, Bobak, Taylor & Weber

(57) ABSTRACT

A tire inflation and handling assistance device provides an adequately stabilized and supported vertical tire support member having a hub engagement and stop structure which can be pivoted from a first generally horizontal, stable position to a stable angled position from about 50 to 75 degrees and more preferably over a range of from about 55 to 70 degrees from the horizontal to enable an uninflated hub and tire assembly to be tilted to a position engaging the tire support member and to facilitate sealing engagement in forming an inflated hub and tire assembly. The angle utilized may be dependent upon the shape and extent of engagement of the hub engagement and stop structure.

7 Claims, 2 Drawing Sheets

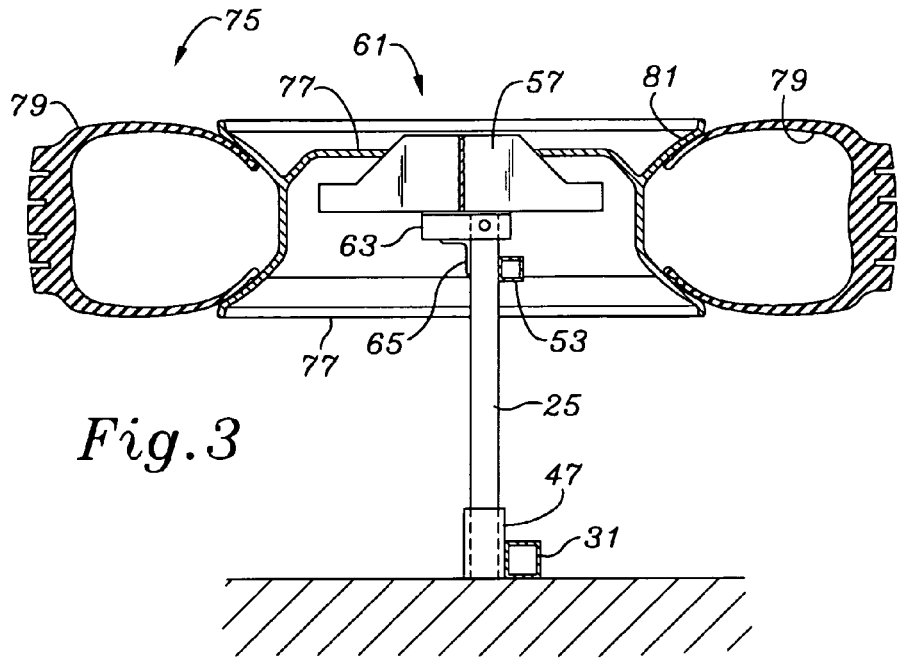
Fig.3
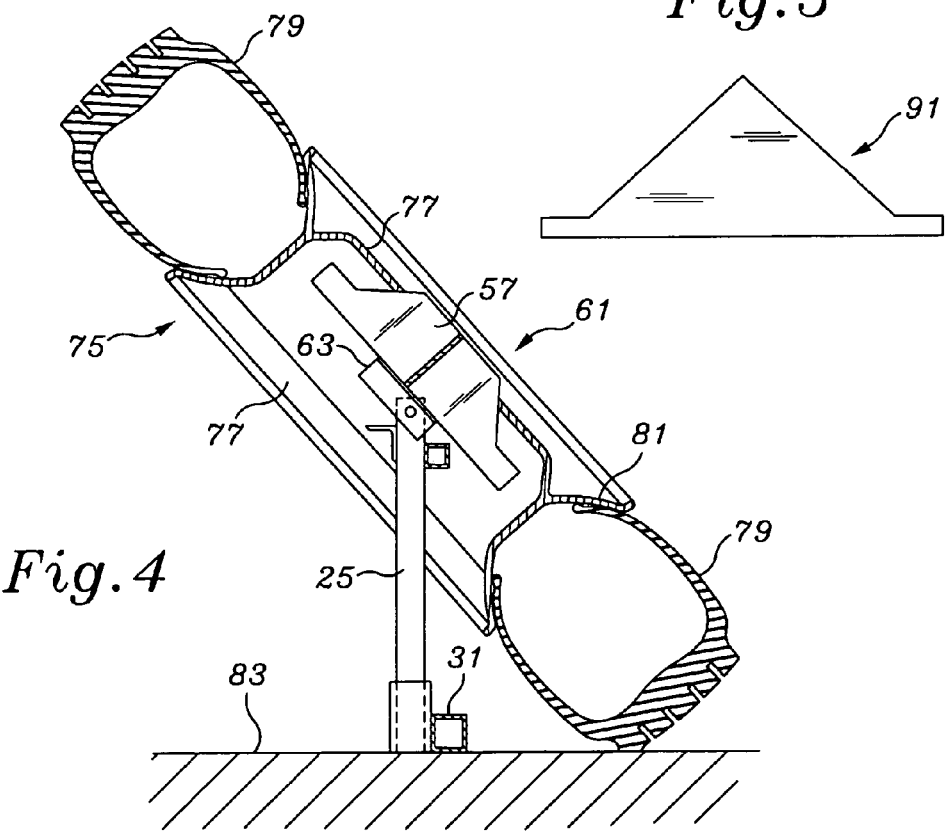
Fig.4
Fig.5

TIRE INFLATION AND HANDLING ASSISTANCE DEVICE

BACKGROUND OF THE INVENTION

The present invention relates to an inflation and handling assistance device for inflatable tires, and particularly to shop equipment to facilitate efficient inflation and safer tire handling.

Standard tire replacement procedures include removal of a damaged or worn tire from a rim, followed by the mounting of a new tire onto the conserved rim. The machinery and methods for this step are known and include powered angular displacement tools which assist the walls of the tire into the depression between the inner and outer rim members.

Once the new tire is mounted in position within the rim walls the next step is the introduction of pressurized air in a manner cooperative with the sealing of the tire rim sealing areas against the radially outer, but inwardly facing areas of the rim walls. In many cases, the tire facing walls in the uninflated state are close together creating a significant gap between one side of the tire walls and the space between the inner and outer rim members.

This gap, especially when the tire and rim assembly is resting on a flat surface, forms to one side and particularly resists engagement of the rim engagement surface of the tire with the opposing inwardly facing area of the rim wall. For smaller tires a pneumatically activated belt or other assist can help with tire sealing. For larger, more stiff tires, the problem requires a different solution. This assistance device works for smaller tires and can overcome the positional forces of having the tire and rim supported by a flat surface. However, larger tires, especially commercial truck tires, are generally too rigid to have the center of their treads forced inward to cause flaring of the tire side walls.

The ground supported tire can be dangerous where a user attempts to lift and support the rim in an attempt to cause the tire to inflate as the hand can be caught between the rim and rim engagement surfaces of the new tire. Further, for tires larger than small automobile tires, attempting to manipulate the tire on a flat surface is not only difficult and dangerous but also one of the worst positions from which to move the tire if inflation is achieved. A single worker must try to reach under the tire to simultaneously lift and push it forward in order to keep a grip. This position is awkward and has a significant incidence of worker injury associated with it.

Even though the tire is lifted from one side, it is still an awkward dead lift. Where the floor surface is slippery, and where the worker is strong lifting the tire from the floor surface may be nearly impossible. A second worker may be required to stabilize the side of the tire which is supposed to be pivoted against the floor, and it may be advantageous to employ a special tool just to pry the weight of the resting tire upward. Even if this is done as safely as possible with two workers, employee injury is still likely to result from prying and lifting a tire in opposition between two workers.

SUMMARY OF THE INVENTION

A tire inflation and handling assistance device provides an adequately stabilized and supported vertical tire support member having a hub engagement and stop structure which can be pivoted from a first generally horizontal position to an angled position of from about 50 degrees to about 75 degrees and more preferably from about 55 degrees to about 70 degrees and more preferably from about 60 degrees to about 65 degrees of displacement from a horizontal position to enable an uninflated hub and tire assembly to be rolled to the tire inflation and handling assistance device, tilted to a position engaging the tire support member and then tilted to a horizontal position; as well as to enable a pressurizably inflated hub and tire assembly to be tilted from a horizontal position to a tilted to a position engaging at or near the ground where it may be further righted for further rolling handling and transport. Other work may be done on the hub and tire assembly utilizing the tire inflation and handling assistance device as a support.

The angle utilized may be dependent upon the shape and extent of engagement of the hub engagement and stop structure, with a more shallow hub engagement and stop structure preferably having a lesser tilt angle and a more linear "through engagement" hub engagement and stop structure enabling a greater magnitude tilt angle.

With the tire inflation and handling assistance device, a worker can roll an uninflated tire and rim assembly to a position adjacent the device and tilt it onto the hub engagement and stop structure where it engages the hub. The uninflated tire and rim assembly is then tilted to a horizontal position in which the hub supports the tire to enable the bottom tire rim sealing areas to seat against the lower rim wall. Air can then be forcibly blown within the remaining opening to cause the tire to expand and seal against the upper rim wall. After engagement, with some pressure, the tire is typically removed and taken to another location for full, safe inflation to an approved operating pressure. Once the tire is filled, the user can tilt the horizontally supported pressurized tire and rim assembly to an angle which enables the tire to engage the ground so that it can continue to be righted to a vertical position with much less effort than would be required to lift it upwardly from a horizontal surface. The device thus facilitates handling of the uninflated hub and tire assembly, facilitates inflation of the hub and tire assembly, and further facilitates unloading of the inflated hub and tire assembly for easy movement by one worker.

The tire inflation and handling assistance device may be provided with a stand which disassembled to a stowable configuration, or it may be mounted to be supported from a bracket or fitted opening attached to any other appropriate structure, especially where it is desired to minimize the floor footprint of the support, or where an easier and more complete stowage is desired.

BRIEF DESCRIPTION OF THE DRAWINGS

The invention, its configuration, construction, and operation will be best further described in the following detailed description, taken in conjunction with the accompanying drawings in which:

FIG. 3 is a side sectional view taken through a hub and tire assembly supported by the tire inflation and handling assistance device of FIGS. 1 and 2 and shown without the stand support details;

FIG. 4 is a side sectional view as seen in FIG. 3 but with the hub and tire assembly shown in a tilted position bringing the tire into contact with the ground; and FIG. 5 is a view of an alternative hub engagement and stop structure presenting a complete upper surface.

DETAILED DESCRIPTION OF THE INVENTION

While the present invention will described in terms of a stand alone, independently supported device and system used to facilitate tire inflation and handling, the operative portion of the device can be mounted in a variety of locations and operative positions in the shop environment. The stand-alone version will facilitate a complete, unassisted deployment and complete breakdown for stowage.

Figure 1:
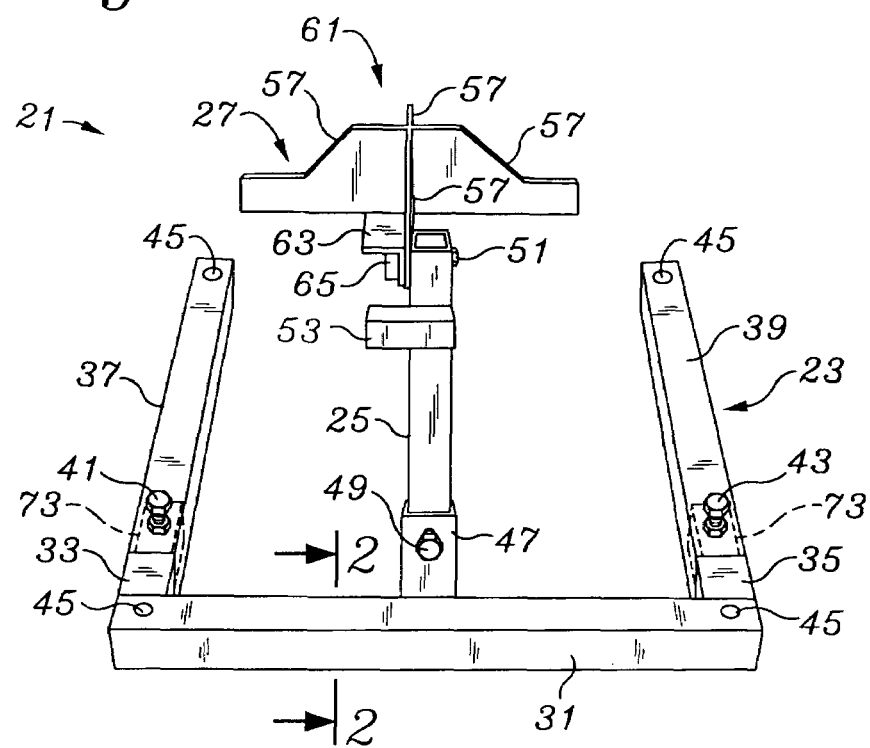
FIG. 1 shows stand-alone tire inflation and handling assistance device.

Referring to FIG. 1, a tire inflation and handling assistance device 21 includes a base portion 23, vertical support member 25 supporting a pivotable hub engagement and stop structure 27.

The base portion 23 includes a main member 31 preferably constructed of structural steel, such as I beam or tubular steel. The ends of the main member 31 have short angular extensions 33 and 35. At the ends of the extensions 33 and 35 an insertion member (not shown) extends into a leg member 37 and into a leg member 39, respectively. Leg member 37 has an insertion locking threaded member 41 while leg member 39 has an insertion locking threaded member 43.

The locking threaded members 41 and 43 enable a locked assembly position shown in FIG. 1, with subsequent unlocking and release of the insertion members (not shown) which lie just inside the leg members 37 and 39. In the configuration shown, the detachment of the leg members 37 and 39 form two of the three main dis-assembly junctions.

Also shown in leg members 37 and 39 and main member 31 are bolt-down openings 45. Bolt-down openings 45 are formed by opening an aperture on the upper side of any of the leg members 37 and 39 and main member 31, with a smaller aperture on the lower side of the same members. This enables a bolt having a bolt head to be passed through the bolt-down openings and through a smaller aperture on the underside of the leg members 37 and 39 and main member 31, with the bolt head to engage the lower wall of the leg members 37 and 39 and main member 31 to enable the base portion 23 of the tire inflation and handling assistance device 21 to be securely floor mounted if desired.

At a point near the center of main member 31, an insertion sleeve 47 is welded lateral to the member 31 and in a vertical position. Into the insertion sleeve 47, the vertical support member 25, is supported. An insertion locking threaded member 49 is provided in the insertion sleeve 47 to lock the vertical support member 25 into place.

At the top of the vertical support member 25, a bolt 51 provides pivoting support to hub engagement and stop structure 27. The hub engagement and stop structure 27 is mounted to pivot toward the observer of FIG. 1. A stop member 53 near the top of vertical support member 25 acts to limit the degree of tilt of hub engagement and stop structure 27 which is shown in FIG. 1 in the horizontal position. The degree of tilt is from about 50 to 75 degrees and more preferably from about 55 to 70 degrees from the horizontal position shown in FIG. 1 to enable an uninflated hub and tire assembly (not shown) to be tilted to a position engaging the tire support member and to enable an inflated hub and tire assembly.

The hub engagement and stop structure 27 has four plates 57 which are mounted orthogonally together to form a minimalist structure for generally matching and permitting centering in a well space in a commercial truck tire. Other shapes for different types of tires is possible, as well as a more protruding smaller center structure to more fully extend through and engage and stabilize a tire hub.

The configuration shown includes the hub engagement and stop structure 27 being mounted to the side of the vertical support member 25, with the width of the stop member 53 spanning the width of both the vertical support member 25 and lower pivotal attachment portion of the hub engagement and stop structure 27. It may be preferable to have a support configuration which is centered over the vertical support member 25 for improved lateral balance distribution.

For commercial truck and trailer tires which may be about 38 inches in diameter, the dimensions of the tire inflation and handling assistance device 21 may include a 28 inch length for the leg members 37 & 39, and the main member 31. The insertion sleeve 47 is preferably about 7 inches in length and of an internal dimension which will fit the external dimension of the vertical support member 25.

The preferred length of the vertical support member 25 is about 19 inches. Each of the plates 57 have a major dimension length of about 6.5 inches to result in a hub engagement and stop structure 27 having an overall width of about 13 inches. The angled portion of the hub engagement and stop structure 27 has an angle of about 40 degrees and leaves a flat length atop each plate 57 of about two inches and a flat length at the base of the angled length of about 2.75 inches. The four plates 57 form a plate assembly 61 which rests above an angled plate 63. One side of the angled plate 63 is engaged by the bolt 51. The angled plate 63 has a rearwardly located stop plate 65 which steadies the pivoting hub engagement and stop structure 27 in the horizontal position. The stop plate 65 and the stop member 53 set the range of tilt of the hub engagement and stop structure 27 about the axis of the bolt 51.

The height of the top of the plate assembly 61 is about 25 inches, while the height of the bolt 51 and thus the pivot axis is about 19 inches. For a tire and hub assembly of about 38 inches in diameter and a tilt angle limited to about 62 degrees from horizontal, the height of the pivot should be about 0.88 times the radius of 19 inches or about 17 inches.

However, for stability, the center of the plate assembly 61 is both higher than and offset from the pivot so that the weight of the tire and hub assembly lies upwardly and to one side of the pivot axis of the bolt 51. The top of the plate assembly 61 is about 6 inches higher than the pivot, but the design contemplates that the center of any tire and hub assembly will be lower than this point by about 2 to 4 inches. The only requirement is that the tilt be sufficient to have the radial edge of a tire to either touch or come closely enough to the ground to enable a user to tilt the upper edge of the tire and hub assembly off of the plate assembly 61.

As a result of this offset position, the pivoting of the plate assembly 61 provides some upward movement and upper and lateral extension of its center of gravity. The offset position helps to stabilize the tire and hub assembly (not shown) in the horizontal position, an important consideration when manipulating the tire and hub assembly to enable it to seal and initiate pressured inflation.

Figure 2:
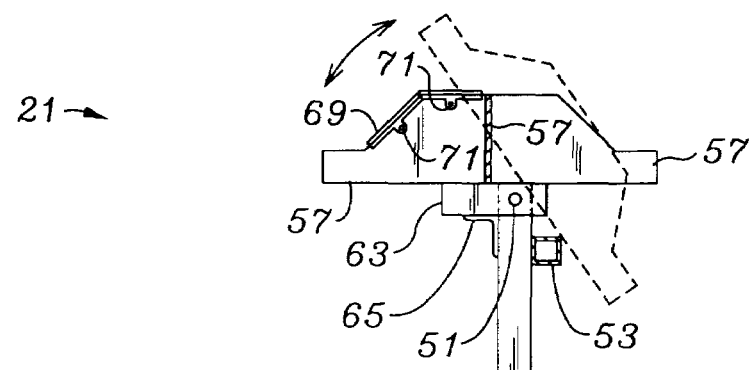
FIG. 2 is a side view, taken along line 2-2 of FIG. 1 and illustrates in phantom the range of tilt of the tire inflation and handling assistance device seen in FIG. 1.
Figure 2:
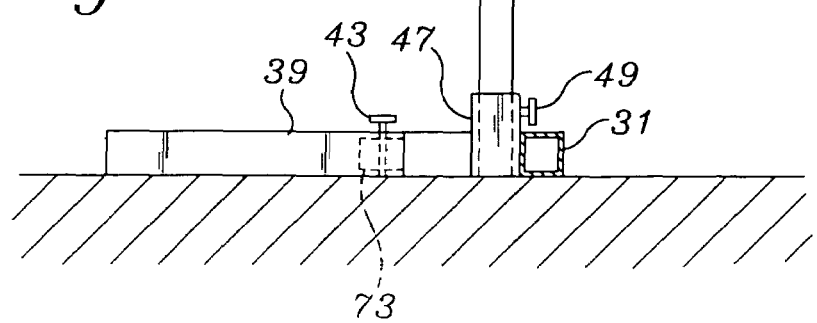

Referring to FIG. 2, a side view of the tire inflation and handling assistance device 21 taken along line 2-2 is shown. The horizontal position is shown in solid line format while the tilted position is shown in dashed line format. As can be seen, a lower edge of one of the four plates 57 engages the stop member 53 to limit the angular tilt of the plate assembly 61. Other structures can be used.

FIG. 2 also more clearly shows the action of the stop plate 65 in providing a stable, well supported horizontal support to the angled plate 63. Other structures can be used to support plate assembly 61 and other locations and types of the stop structures 65 and 53 are possible. Note that the location of the pivot axis within the bolt 51 is offset from the center of the support plate assembly 61. Even where a support, such as angled plate 63 is centered with respect to the vertical support member 25 with respect to the view seen in FIG. 1, an offset along the plane of tilt will provide the stability necessary to enable workers to manipulate the tire and hub assembly to initiate pressurized inflation. In the alternative, a latch or user operable lock can be used to more completely stabilize the plate assembly 61 in the horizontal position with release to the tilt position.

Also seen in FIG. 2 is a polymeric or synthetic protector 69 which may be a "U" shaped and may have a bolt or rivet attachment device 71. This use of a protector can help prevent scuffing of expensive hubs onto and off of the plate assembly 61. In practice, the insertion sleeve 47 can be attached to any structure in the shop which has sufficient holding force to provide support to the hub engagement and stop structure 27 and the weight of the hub and tire assembly.

The insertion sleeve 47 or similar structure can be formed into a concrete floor to enable the hub engagement and stop structure 27 to be rapidly deployed and stowed. The ability to eliminate the remaining stand members, including main member 31 and leg members 37 and 39 will facilitate deployment and stowage, and will eliminate the floor space disruption. In the alternative, the insertion sleeve 47 can be attached or welded to any other available structure in the shop which has adequate clearance for accommodating a tire and hub combination.

Also seen for the first time in FIG. 2 is the insertion portion 73 at the ends of the short angular extensions 33 and 35. The insertion portions are preferably of reduced cross sectional dimension to both enable fit into the leg members 37 and 39 and secured by the insertion locking threaded member 49. The exterior dimensions of the short angular extensions 33 and 35 should match the exterior dimensions of the leg members 37 and 39 both to insure good fit and a flat support surface profile.

Referring to FIG. 3, a hub and tire assembly 75, including hub 77 and tire 79 is seen mounted on tire inflation and handling assistance device 21 shown from the vertical support member 25 and upward and eliminating main member 31 and leg members 37 and 39, for clarity. The plate assembly 61 is seen protruding through a centered opening of hub 77. The configuration shown is one where full pressurized inflation has occurred, but this position would also be had where the tire 79 is fitting loosely within the hub 77. In this position, and with an uninflated tire 79, the hub 77 and tire 79 would form a seal along the bottom portion of the hub 77 and tire 79 with the object being the introduction of enough air mass and velocity to cause the upper inside portion of hub 77 rim 81 to seal.

Referring to FIG. 4, the hub and tire assembly 75 is seen mounted on tire inflation and handling assistance device 21 in a position where a just inflated tire 79 has been tilted to contact the ground 83. The configuration is also equivalent to one where an un-pressurized a hub and tire assembly 75 has been rolled to the tire inflation and handling assistance device 21, the hub engagement and stop structure 27 being tilted to engage the open center of the hub 77 as the worker leans the hub and tire assembly 75 toward the tire inflation and handling assistance device 21. Once the open center of hub 77 has been brought over the plate assembly 61, further pressure on the upwardly extending radial portion of hub and tire assembly 75 causes the assembly to tilt upward and horizontally to the configuration shown in FIG. 3.

The advantages of the tire inflation and handling assistance device 21 will assist in inflation when in the position of FIG. 3, and will assist in handling when brought to and taken from the configuration seen in FIG. 4. The shape of the plate assembly 61 may vary along with the angle of tilt seen in FIG. 4. Where the diameter of the hub and tire assembly 75, along with the pivot height of the hub engagement and stop structure 27 creates a greater tilt angle than is shown in FIG. 4, it may be desired to provide a modified plate assembly 61, or even a differently shaped engagement structure for hub engagement and stop structure 27 other than plate assembly 61.

Note that the upper angled portion of the plate assembly 61 in FIG. 4 is nearly, but not quite horizontal and tilts somewhat downwardly in the direction of the hub 77 to assist with loading the hub and tire assembly 75 onto the plate assembly 61. This arrangement, with the geometry shown, insures easy access to the plate assembly 61 by simply tilting the hub and tire assembly 75 onto it. Where it is desired to have the hub and tire assembly 75 approach and engage a hub engagement and stop structure 27 at a steeper angle, a substitute for the plate assembly 61 may include a deeper penetration through the central opening of the hub 77 than is shown in FIGS. 3 and 4 to insure that loading from a steeper angle will not create slippage.

Further, the hub engagement and stop structure 27 can be made of a solid shape or it can have an engagement shape which is a continuous surface. The use of four, three, five or more plates 57 radiating from the center having edge engagement as is shown in FIGS. 3 and 4 provide stable, sturdy engagement, but the force is concentrated on the areas where the edges of the plates 57 engage the hub 77 opening. The material of construction of the plates 57 should be chosen for wear resistance, and any synthetic protector 69 chosen should have a resistance to deformation consistent with the concentration of high force due to the limited contact area between the intersection of an edge on plate 57 and an edge of a circular opening of the hub 57. Increased area can be created by increasing the thickness of the plates 57, as well as by the addition of a conical shaped covering material to distribute the contact area.

In fact, an extended height conical surface could provide structure which would achieve a more extended penetration as well as an extended surface area coverage. Referring to FIG. 5, one such design is shown as a hub engagement and stop structure 91 and which has side angles which are consistent with the upper angled edges of the plate assembly 61. The internals of the hub engagement and stop structure 91 could be of any design, or the hub engagement and stop structure 91 could be welded atop the plate assembly 61 with or without the extension of the plates 57 to underlie the apex of the cone shaped upper extent of hub engagement and stop structure 91.

While the invention has been described in terms of a stable support for two position tilting of a hub and tire assembly of any size, and in particular a support which facilitates vertical rolling, tilting to engage a hub engagement and stop structure, controlled further tilting to a horizontal position, pressurization, tilting back to a slanted position followed by tilting pressure to a vertical position to facilitate rolling, one of ordinary skill in the art can see that the device of the invention can be applied to many appliances and process tools. The present invention may be applied in any situation where movement from an vertical rolling position to an energy favorable horizontal position and back to a vertical rolling position is desired.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A tire inflation and handling assistance device in combination with a hub and tire assembly comprising a hub and a tire, the device comprising:
   a support member;
   a hub engagement and stop structure mounted on said support member and pivotable between a first substantially horizontal position for supporting the hub and tire assembly and facilitating pressurization and inflation of the tire to seal the tire to the hub and a second tilted position for engaging solely a central opening of the hub of the hub and tire assembly when the hub and tire assembly is positioned adjacent to and leaned onto the hub engagement and stop structure, wherein the second tilted position facilitates engagement of or removal of the hub and tire assembly to or from the hub engagement and stop structure while the tire is on or near the ground, wherein the central opening of the hub is over the support member when the hub and tire assembly is in the first substantially horizontal position, and wherein the hub and tire assembly is solely supported by the hub engagement and stop structure.

2. The tire inflation and handling assistance device in combination with a hub artide assembly as recited in claim 1 wherein an angle of pivot between said first position and said second position is in the range of from about 55 degrees to about 70 degrees of displacement from a horizontal position to enable the hub and tire assembly to be tilted to and from engagement with said hub engagement and stop structure and to enable said hub engagement and stop structure and supported hub and tire assembly to move to and from a substantially horizontal position.

3. The tire inflation and handling assistance device in combination with a hub atide assembly as recited in claim 1 wherein an angle of pivot between said first position and said second position is about 65 degrees of displacement from a horizontal position to enable the hub and tire assembly to be tilted to and from engagement with said hub engagement and stop structure and to enable said hub engagement and stop structure and supported hub and tire assembly to move to and from a horizontal position.

4. The tire inflation and handling assistance device in combination a hub atide assembly as recited in claim 1 wherein said hub engagement and stop structure further comprises at least three plate sections for solely supporting said hub and tire assembly at the central opening of said hub.

5. The tire inflation and handling assistance device in combination with a hub atide assembly as recited in claim 1 wherein said hub engagement and stop structure is designed to extend at least partially through the central opening of the hub.

6. The tire inflation and handling assistance device in combination with a hub atide assembly as recited in claim 1 wherein said angle of pivot between said first position and said second position is in the range of from about 50 degrees to about 75 degrees of displacement from a horizontal position to enable the hub and tire assembly to be tilted to and from engagement with the hub engagement and stop structure and to enable said hub engagement and stop structure and supported hub and tire assembly to move to and from a horizontal position.

7. The tire inflation and handling assistance device in combination with a hub and tire assembly comprising a hub and a tire, as recited in claim 1, wherein said hub and tire assembly, when engaged to said hub engagement and stop structure, has a center of gravity to one side of a pivot axis of the hub engagement and stop structure in a direction that tilts the hub and tire assembly toward the horizontal position.

* * * * *

UNITED STATES PATENT AND TRADEMARK OFFICE
CERTIFICATE OF CORRECTION

PATENT NO. : 7,225,849 B2
APPLICATION NO. : 10/773953
DATED : June 5, 2007
INVENTOR(S) : Stan Routt and Hermilio Rubio Page 1 of 1

It is certified that error appears in the above-identified patent and that said Letters Patent is hereby corrected as shown below:

Col. 7, in claim 2, line 2, "artide" should be -- and tire --.

Col. 8, in claim 3, line 2, "artide" should be -- and tire --.

Col. 8, in claim 4, line 2, "artide" should be -- and tire --.

Col. 8, in claim 5, line 2, "artide" should be -- and tire --.

Col. 8, in claim 6, line 2, "artide" should be -- and tire --.

Signed and Sealed this

Thirty-first Day of July, 2007

JON W. DUDAS
*Director of the United States Patent and Trademark Office*